United States Patent Office 3,843,410
Patented Oct. 22, 1974

3,843,410
FUEL CELL POWER STATION
Dieter Spahrbier, Frankfurt-Rodelheim, Germany, assignor to Varta Aktiengesellschaft, Frankfurt am Main, Germany
Continuation-in-part of application Ser. No. 238,501, Mar. 27, 1972. This application Aug. 24, 1972, Ser. No. 283,462
Int. Cl. H01m 27/12
U.S. Cl. 136—86 R                                    17 Claims

ABSTRACT OF THE DISCLOSURE

A self-contained source of well regulated electric power employing a set of fuel cell batteries, whose electrolyte-fuel mixtures are replenished by a cascade supply arrangement automatically controlled to maintain predetermined concentration distributions within the batteries.

Reactant gas for the batteries is obtained by decomposition of a stored liquid.

Heat exchanger means are provided to absorb the heat of decomposition and to stabilize the operating temperature of the batteries.

---

This invention relates to an electric power generating station, such as might be utilized in some inaccessible location, or in an uninhabited environment, where it would have to function in a self-sufficient and unattended manner over subtantial periods of time, such as under water or in space bodies. The station is ideally suited for under sea power station. The present application is a continuation-in-part of application Ser. No. 238,501, filed Mar. 27, 1972.

It is known to generate electric power by means of fuel cell batteries employing electro-chemical interactions between a gas and a liquid electrolyte-fuel mixture. It is also known to counteract declines in the performance characteristics of such fuel cell arrangements, attributable either to ageing or to power drain, or both, by replenishing the electrolyte-fuel mixture in the cells on a more or less continuous basis.

It is an object of the present invention to provide a particularly desirable arrangement of such fuel cells, together with means for replenishing their electrolyte-fuel mixture.

This is accomplished, in accordance with the invention, by subdividing the fuel cell arrangement into a plurality of stages, each equipped with its own reservoir for electrolyte-fuel mixture. The reservoirs of the successive stages are arranged in cascade with respect to fresh electrolyte-fuel mixture available for replenishment as the mixture in the stages becomes depleted. Automatic control means are provided for sensing the state of depletion of the mixture in at least one of the stages and for controlling the replenishment process accordingly. The reservoirs are connected to each other and to the fuel cells in such manner as to minimize undesired electrolytic and hydrostatic interactions between the various stages. Heat control means are provided to achieve and maintain stable thermal operating conditions within the system.

Figure 1:
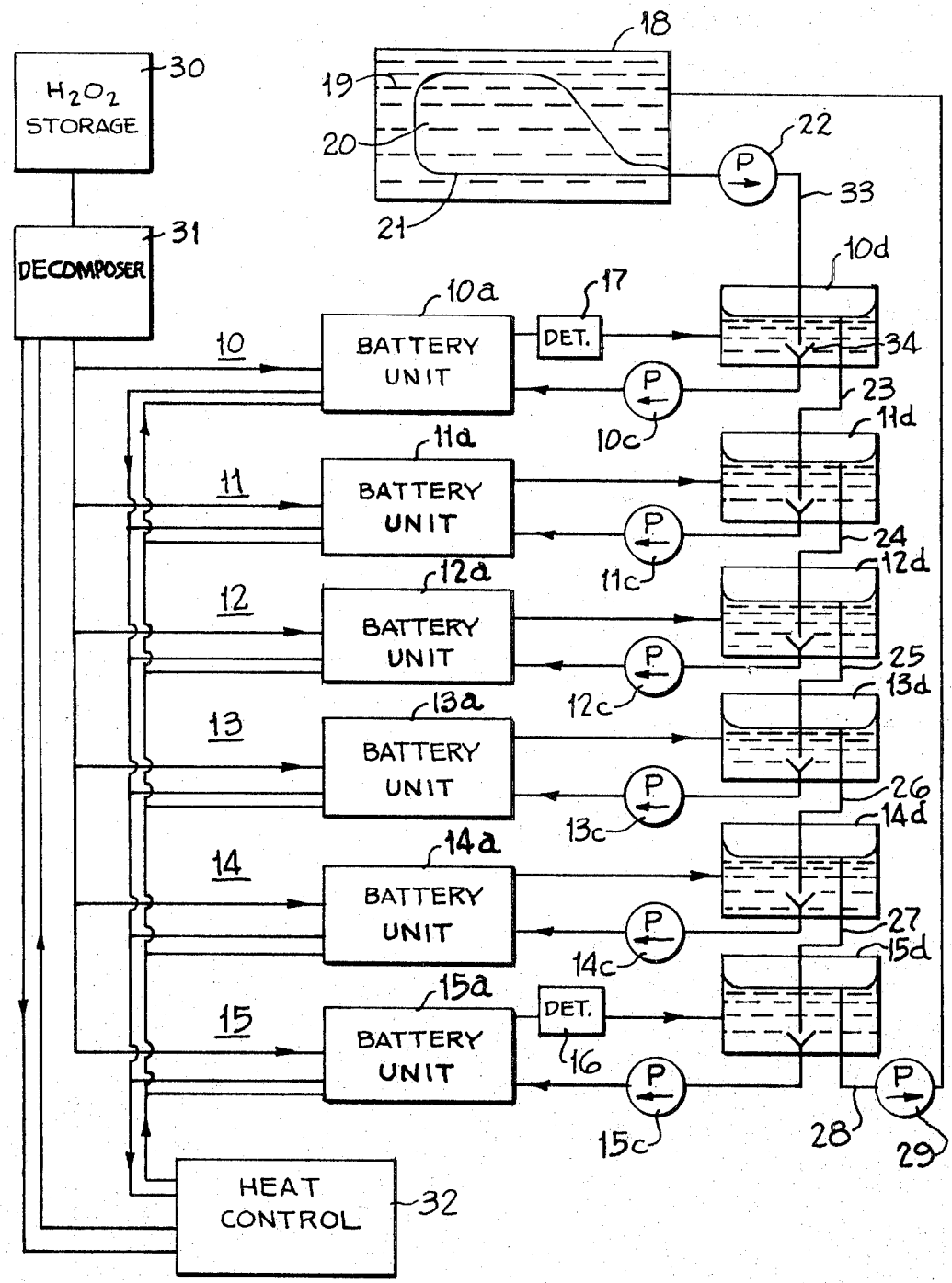
Figure 2:
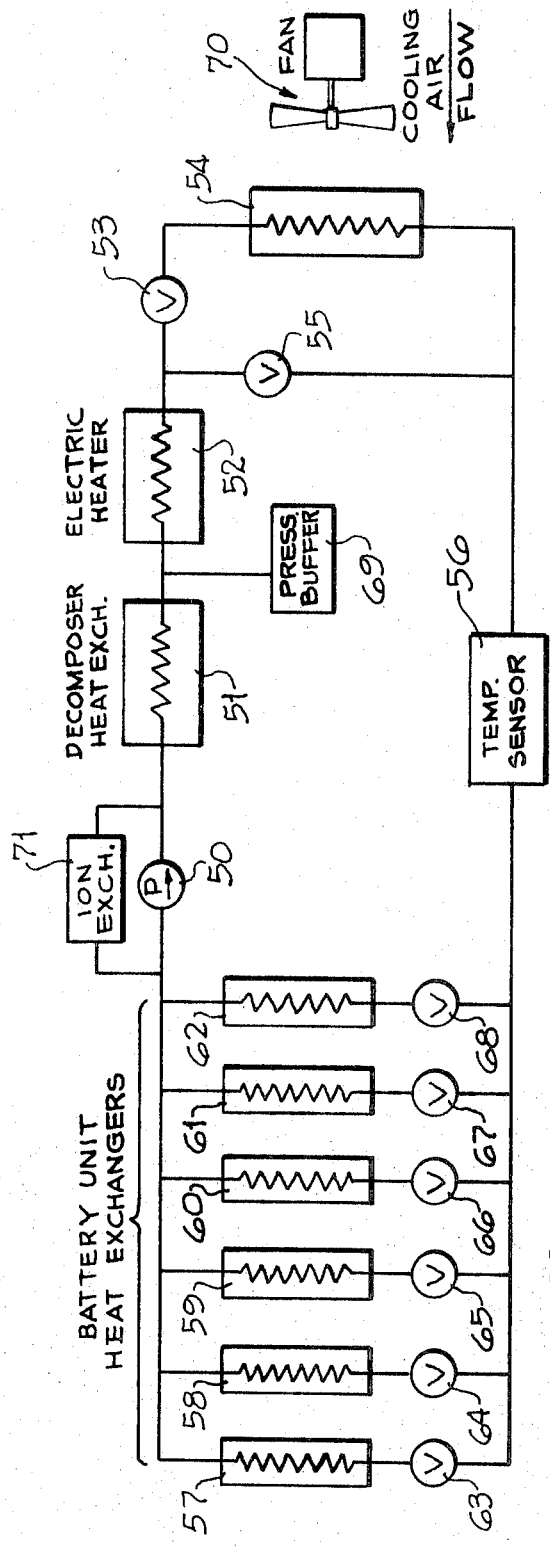

For further details, reference may be had to the description which follows, in the light of the accompanying drawings, wherein FIG. 1 is a diagrammatic illustration of a preferred embodiment of a fuel cell power station embodying the invention, and FIG. 2 is a diagrammatic illustration of the heat control means which forms part of the power station shown in FIG. 1.

The power station of FIG. 1, to which reference may now be had, comprises a plurality of fuel cell battery stages, a set of six such stages respectively designated by reference numerals 10 through 15 in FIG. 1, having been shown for this illustrative embodiment.

The directions of flow of liquids and gases within the system are denoted by arrows applied to the lines representing the pipes or conduits through which such flow takes place.

Each of stages 10 to 15 includes a fuel cell battery unit, designated by the reference numeral of the stage plus the suffix "a" (i.e. 10a for the battery of stage 10, 11a for that of stage 11, and so forth), a pump designated by the reference numeral of the stage plus the suffix "c" and a reservoir means for electrolyte-fuel mixture designated by the reference numeral of this stage plus the suffix "d."

Within each cascade stage, the reservoir means, the pump and the battery itself are interconnected by pipes for circulation of electrolyte-fuel mixture between the reservoir means and the battery, via the pump.

In addition, in the last cascade stage, namely stage 15, there is provided a detector means 16 for sensing the electrolyte concentration of the mixture circulating between the battery 15a and the reservoir means 15d. Another such detector means, namely means 17 is preferably provided in the first cascade stage 10 of FIG. 1.

In addition to the cascade stages, themselves, there is provided a container means 18, which may consist of a closed, outer container divided internally into two separate sections 19 and 20 by a membrane 21. This membrane 21 is so constructed that the internal section 20 which it defines behaves like a collapsible bag. Fresh, undepleted electrolyte-fuel mixture is contained within the collapsible bag section 20. The outlet of bag section 20 is connected via pump 22 to the reservoir means of cascade stage 10, namely that designated by reference numeral 10d in FIG. 1.

Reservoir means 10d, in turn, is connected not only to battery 10a, as previously explained, but also, via an overflow pipe 23, to reservoir means 11d. From there another overflow pipe 24 leads to reservoir means 12d, and from there, in turn, overflow pipes 25, 26 and 27 lead successively from one into the next of reservoir means 12d, 13d, 14d, and 15d. Reservoir means 15d also has an overflow pipe 28, but it leads back to internal section 19 of container 18, via pump 29. Liquid returning to section 19 fills up space vacated by liquid drawn from section 20, thereby minimizing the space demands of container 18.

A storage means 30 is also provided externally of the cascade stages 10 through 15, for storage of liquid material decomposable to yield reactant gas such as oxygen and hydrogen for the fuel cell batteries. This liquid storage means may take any conventional form as, for example, that of an enclosed liquid-tight tank. Decomposing means 31 for deriving this gas is provided between storage means 30 and the respective battery units. Decomposing means 31 may also take any conventional form. There is generally provided a catalyst to decompose the $H_2O_2$. Finally there is a heat control means 32.

The battery units 10a through 15a, themselves, may take any one of a variety of conventional forms, and may, for example, be assemblies of the type of individual battery elements described in British patent specification 1,195,633, which is incorporated herein by reference. Such elements are manufactured by Varta AG, Frankfurt, Germany under the type designation BE 2M 2,660/2 and other such batteries are available. Each individual battery unit 10a through 15a may comprise 21 such elements, and the six battery units, collectively, would therefore comprise a total of 126 elements. These batteries function on an electrolyte-fuel mixture of potassium hydroxide and methanol, and oxygen as the reactant gas. Other known fuel and oxidant gases can be used.

The battery units may be connected electrically together to meet the voltage and power output requirements of the power station. For example, they may be connected together in series to yield a 150 volt rated station with nominal 5 kw. power output.

The collapsible bag 20 defined by flexible membrane 21 within container 18, as well as each of the reservoir means 10d through 15d are initially filled with fresh electrolyte-fuel mixture which may be constituted of 8N KOH+10M CH$_3$OH. Storage means 30 contains H$_2$O$_2$, which is decomposed into oxygen and water in decomposer 31.

The system is energized by starting the flow of oxygen, coming from the H$_2$O$_2$ storage means 30 via decomposer 31 to each of the various battery units 10a through 15a. Upon the start of such oxygen flow, these battery units build up voltage and begin to deliver electrical power. A portion of that electrical power is applied to the individual circulating pumps 10c through 15c associated with the respective battery units and also to pump 29, all of which are thereby activated.

Operations of pumps 10c through 15c, respectively, causes flow of electrolyte-fuel mixture from the corresponding reservoir through the pump into the battery unit, itself, and back out of that battery unit into the reservoir. As this flow continues and electric power is drawn from the battery units, the KOH concentrations of the electrolyte-fuel mixtures in the various reservoirs will decline. It is to be noted that during this initial phase of operation the concentration decline will take place more or less equally in each of the cascade steps.

Once this concentration has declined to a preselected level, such as 7N, the concentration detector means 17 in cascade stage 10, which may employ as its active element an ion exchange membrane that expands with increasing depletion and vice versa, responds by activating pump 22 which then runs for a preset length of time, after which its stops and waits to be activated anew. Operation of pump 22 withdraws additional fresh electrolyte-fuel mixture from the collapsible bag 20 within container 18 and introduces this fresh mixture into the reservoir 10d of the first cascade stage 10. The end of pipe 33 through which this introduction takes place is preferably below the surface of the liquid in reservoir 10d and well inside funnel-shaped intake 34 of the pipe leading to pump 10c.

The capacity of pump 22 is preferably chosen to be considerably lower than that of any of the pumps 10c through 15c forming part of the various cascade stages 10 through 15. In practice, the capacity of pump 20 may be one-third that of each of pumps 10c through 15c.

The purpose of introducing fresh electrolyte-fuel mixture directly into funnel-shaped intake 34, and of doing so at a much lower rate than that at which it is circulated by pump 10c, is to increase the likelihood that the fresh mixture will reach the battery 10a before it has been materially diluted by the partially depleted mixture contained within the rest of reservoir 10d.

The total quantity of liquid in reservoir 10d will, however, increase by virtue of this introduction of fresh mixture, and the excess so introduced will spill over into overflow pipe 23, through which it will flow into reservoir 11d associated with the second cascade stage 11.

This overflow pipe 23, as well as the other overflow pipes 24 through 27 which lead from one reservoir to the next in the succession of cascade stages 10 through 15, likewise and preferably below the surface of the electrolyte-fuel mixture in the respective reservoirs and deep within funnel-shaped intakes leading, in each stage, to the respective pump connecting the reservoir to the battery unit of that stage. This, together with the pump capacity relationships previously noted, has the effect, at each cascade stage, of drawing directly into the battery unit itself electrolyte-fuel mixture which has previously been circulated through the battery unit of the preceding cascade stage.

The length of each period of running time for pump 22 is preferably less than the time it would take fresh solution supplied via pump 22 from being recirculated to the overflow pipe 23 leading from reservoir 10d to reservoir 11d. Based on this requirement, the limiting value for each running period $t_o$ of pump 22 is given by the expression $$t_o < \frac{V_B}{v_o}$$

where $V_B$ is the volume of electrolyte-fuel mixture within the battery unit 10a, and $v_o$ is the rate of flow of mixture from container 18 to reservoir 10d under the influence of pump 22. This running period of pump 22 may be controlled by a timer of any suitable, conventional form. In this way, the overflow mixture being supplied to the second cascade stage 11 via overflow pipe 23 will not have as high a concentration as the fresh mixture supplied to the first cascade stage 10. Likewise, successive subsequent cascade stages will also be supplied with progressively less concentrated replenishment mixtures. Therefore, as the system continues to operate, there gradually takes place a progressive reduction in concentration from one cascade stage to the next.

After a period of time, during which the concentration in each stage has been depleted through usage and then at least partially restored through intermittent introduction of higher concentration mixture from container 18 (in the case of the first stage), and from prior stages (in the case of the second through the sixth stages), a condition will establish itself in which successive cascade stages are operating at progressively lower concentrations. For example, when the concentration level in the first cascade stage 10 drops to 7N, that in the second stage 11 might be as low as 6N, and so on down, the concentration in the sixth cascade stage 15 being only 2N. The concentration detector means 16 which forms part of that sixth cascade stage 15, and which may also utilize as its active element a conventional ion exchange membrane, is arranged to sense the attainment of this terminal level of reduced concentration, and to respond thereto to also activate pump 22.

Thus, pump 22 is subject to activation by either concentration detector means 17, if the concentration in stage 10 falls below 7N, or by detector means 16, if the concentration in stage 15 falls below 2N. Initially, when the concentration throughout the various stages is near 8N, the detector means 17 will determine when pump 22 operates. Ultimately, and during steady state operation, the determining factor will be detector means 16. This is because the volume of the electrolyte-fuel mixture increases with increased usage and, therefore, concentration reduction takes place more rapidly in the final cascade stage 15 (where it is sensed by detector means 16) than in the first cascade stage 10 (where it is sensed by detector means 17).

The heat stabilizing requirements of the system of FIG. 1 are met by a heat control means 32, illustrated in more detail in FIG. 2, to which reference may now be had. The heat control means there shown comprises a closed-loop water cooling system employing circulating pump 50, a first heat exchanger means 51 in heat exchange relation with decomposer 31 of FIG 1, an electric heater 52, a magnetically actuatable valve 53 in circuit with a heat exchanger means 54, and both by-passed by a by-pass valve 55, a temperature sensing means 56 and a plurality of battery heat exchanger means 57 through 62, respectively in heat exchange relationship with the interiors of battery units 10a through 15a of FIG. 1. These heat exchanger means form part of the respective battery units and are therefore not separately represented in FIG. 1. Each heat exchanger means 57 through 62 has its own individual flow control valve, designated 63 through 68, respectively. A pressure buffer 69 is provided for the closed water loop.

A fan 70 is positioned to blow air across heat exchanger means 54.

After operation of the power station has been initiated by feeding oxygen to the individual battery units, as previously explained, the rising output voltage from the power station will actuate the circulating pump 50 of the heat control means 32 and turn on fan 70. The electric power from the station also actuates the electric heater 52, which reinforces the heating effect stemming from the operation of $H_2O_2$ decomposer 31, and from the electro-chemical reactions taking place within the individual battery units, thereby bringing the entire system quickly to the desired operating temperature. The temperature sensor 56 responds to attainment of that temperature by disconnecting electric heater 52 and simultaneously opening magnetic valve 53. This causes the water flow in the closed-loop system of FIG. 2 to shift from the path containing by-pass valve 55 to the path containing heat exchanger 54. The water thus flowing through heat exchanger 54 is by fan 70. When the water has been sufficiently cooled in this manner, the temperature sensor 56 causes valve 53 to close again. This stops the water from flowing through the heat exchanger 54 and it will flow instead through by-pass valve 55. In this way, the temperature sensor 56 causes the control system 32 to maintain the water circulating therein at a relatively uniform temperature. As this water then flows through the individual battery unit heat exchangers 57 through 62, it removes the heat generated in these battery units. It may also be desirable to control the conductivity of the water in the heat control system 32, in order to preclude any possibility that dangerous voltages might be transmitted to the metallic elements of the heat control system. This may be accomplished by means of ion exchanger 71, which may be connected as a by-pass to the main path of water flow, preferably by-passing pump 50.

It has previously been explained that the rate at which fresh electrolyte-fuel mixture is delivered to cascade stages 10 through 15, from collapsible bag 20 within container 18 is preferably considerably lower than the rate at which the electrolyte-fuel mixture is circulated within each individual cascade stage. More specifically, it is preferred that the rate of delivery of the fresh mixture—and therefore also the ensuing flow of mixture from one cascade stage to the next—be sufficiently low to take place in discontinuous fashion as, for example, in the form of separate droplets. This provides both electrolytic and hydrostatic isolation for the individual stages of the cascade arrangement. That, in turn, has various desirable results, including, particularly, freedom of power station from electrical short circuits and shocks.

Also, while this is not essential, it is preferred that the withdrawal of mixture from each separate reservoir 10d through 15d, for circulation to the battery unit in the corresponding cascade stage, take place through the bottom of the reservoir, rather than through its side. This has the effect of minimizing the unwanted accumulation of gas bubbles in the pipe through which withdrawal takes place.

It will be understood that many varying embodiments of the invention may be devised, without departing from the inventive concept.

For example, while a six-stage cascade arrangement utilizing fuel cell elements of a particular type and in particular quantity has been described, other types of cells, in other quantitative arrangements may be used, to accommodate particular design requirements.

In the specific arrangement previously described, the introduction of fresh electrolyte-fuel mixture takes place in discrete increments, each triggered by the sensing of a particular degree of concentration reduction by the concentration detector means 16 or 17. Alternatively, it is possible to provide for such introduction in a continuous fashion. In that case, the rate of introduction may be controlled by sensing the intensity of the load current drawn from the power station. Apparatus for sensing that current intensity, for the purpose of regulating the pump which introduces the fresh mixture so as to maintain the level of concentration in each cascade stage steady at its desired value, is disclosed, for example, in U.S. Pat. No. 3,317,348. In particular, in FIG. 2 of of that patent there is disclosed apparatus for sensing the load current of a power source and controlling certain actions in response thereto. Similar sensing and control apparatus may be employed in the present case and, accordingly, the disclosure of said Pat. No. 3,317,348 is incorporated herein by reference.

Also, it is not always essential to utilize two concentration detector means (such as 16 and 17 in FIG. 1). When two such detector means are used, the entire power station—including the storage bag 20 and the reservoirs 10d through 15d—may be filled initially with electrolyte-fuel mixture at the same, uniform concentration. The two detector means then function to gradually establish the desired different concentration levels in the different stages.

If, on the other hand, the reservoirs are initially filled with mixture at the respective different levels of concentration, then the detector means 16 in the sixth cascade stage suffices to maintain this distribution of concentration levels in the different stages, and the other detector means is not required.

Moreover, if the reservoirs are initially filled with electrolyte-fuel mixture having the desired different concentrations, then the single concentration detector means which is still needed may be placed in any of the six stages—adjusted, of course, to respond to a decrease of concentration below the level desired for that stage. The reliability of the system, however, varies depending upon the cascade stage in which that single detector means is placed. This reliability is lowest with the detector means in the first stage, rising progressively as the detector means is placed in subsequent stages, and being highest when the detector means is in the final stage.

The specific arrangement described relies on gravity to cause flow of electrolyte-fuel mixture out of the various cascade stages, via their respective overflow pipes. If gravity should be absent, as might be the case in a space body, then such flow would have to be produced by pumping and, in addition, all containers would have to be both liquid- and gas-tight. If gravity-like forces are artificially produced, as by rotation of the space body, then these precautions become superfluous.

In the specific arrangement described, the battery unit of each cascade stage may contain 7 liters of electrolyte-fuel mixture, and the reservoir of each stage may contain 6 liters of mixture.

The circulating rate of the mixture within each individual cascade stage may range from 3 liters per minute during normal load conditions, e.g. below 5 kw., to 6 liters per minute at higher loads, e.g. above 5 kw.

The rate at which fresh mixture is supplied may be 1 liter per minute, and each supply period may be of two minutes duration.

However, many other relationships and parameters may be established depending upon the particular requirements.

Accordingly I desire the scope of the invention to be limited only by the appended claims.

What is claimed is:

1. A liquid fuel cell battery arrangement comprising:
   a plurality of individual circulating systems for fuel-electrolyte mixture, each system including a separate fuel cell battery element, a separate associated individual storage tank for said mixture, and means for circulating said mixture from said tank through said associated battery element and back into the same storage tank;
   means for introducing fuel-electrolyte mixture from outside said circulating systems into one of said individual storage tanks;

means for cascading said mixture consecutively through all of said individual storage tanks, said cascading means comprising a separate overflow pipe connecting each storage tank to the next, each overflow pipe having its inlet positioned to establish a predetermined overflow level in one tank, and its outlet positioned below the predetermined overflow level in the next cascade tank;

means for sensing the concentration of said mixture circulating in one of said individual circulating systems; and means responsive to said sensing means to control the flow of said mixture through said introducing means to regulate the sensed concentration.

2. The combination of claim 1 further comprising means for also sensing the concentration of said mixture circulating in a different one of said systems.

3. The combination of claim 2, wherein said means for controlling said mixture flow is responsive to the concentration in the first and last of said cascaded circulating systems.

4. The combination of claim 1, wherein said means for controlling said mixture flow is responsive to the concentration in the last of said cascaded circulating systems.

5. The combination of claim 1, wherein said means for controlling said mixture flow is responsive to the depletion of said concentration to a predetermined level.

6. The combination of claim 5, wherein said flow controlling means responds to said depletion to introduce mixture from outside to the first cascade storage tank for a predetermined length of time and at a predetermined rate.

7. The combination of claim 6, wherein said rate of introduction is substantially lower than the rate of circulation of the mixture between the battery element and the storage tank in each circulating system.

8. The combination of claim 7, wherein said rate of introduction is so slow that the mixture is supplied in discontinuous fashion, such as in separate drops.

9. The combination of claim 6, wherein said predetermined length of time is less than the quotient of the volume of mixture contained within any battery element divided by the rate of introduction of said additional mixture.

10. The combination of claim 3, wherein said flow controlling means is responsive to the depletion of said concentration to different levels in said first and last of said cascaded circulating systems, respectively.

11. The combination of claim 10, wherein said level is substantially lower in the last circulating system than in the first.

12. The combination of claim 1, further comprising:
an enclosed, self-contained storage means for electrolyte-fuel mixture;
means for introducing said mixture from said storage means into said one individual storage tank;
an enclosed, self-contained source of reactant gas; and
means for introducing said gas to said battery elements from said source.

13. The combination of claim 12 further comprising means for returning mixture from the storage tank in the last of said individual circulating systems to a closed, self-contained container means for used mixture.

14. The combination of claim 13, wherein said means for returning mixture includes an overflow pipe leading out of said storage tank in the last individual circulating system.

15. The combination of claim 14, wherein the introduction of additional mixture into the first of said cascaded storage tanks leads to corresponding cascade flow of mixture through said overflow pipes.

16. The combination of claim 13, wherein said mixture storage means and said used mixture container means are housed in a common enclosure, said storage means being in the form of a flexible bag within said enclosure, and the remainder of said enclosure constituting the used mixture container means.

17. The combination of claim 12, wherein said reactant gas source comprises a storage tank containing a liquid decomposable to yield said gas, and means for decomposing said liquid.

References Cited

UNITED STATES PATENTS

| | | | |
|---|---|---|---|
| 3,316,161 | 4/1967 | Jung et al. | 136—86 E |
| 3,300,341 | 1/1967 | Gregory et al. | 136—86 C |
| 3,547,704 | 12/1970 | Pompon | 136—86 C |
| 3,492,163 | 1/1970 | Hilmer | 136—86 R |

WINSTON A. DOUGLAS, Primary Examiner

H. A. FEELEY, Assistant Examiner